April 7, 1942.   E. B. MIDDLETON   2,278,461
PHOTOGRAPHIC SENSITIZING DYES AND COMPOSITIONS CONTAINING THE SAME
Filed Jan. 11, 1939
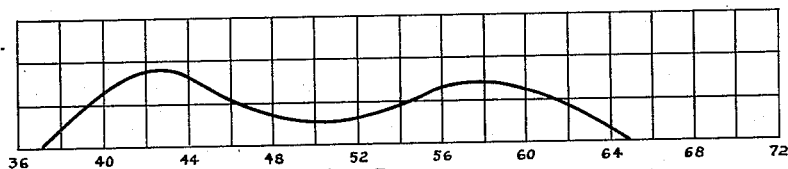
The First Dye of Example I
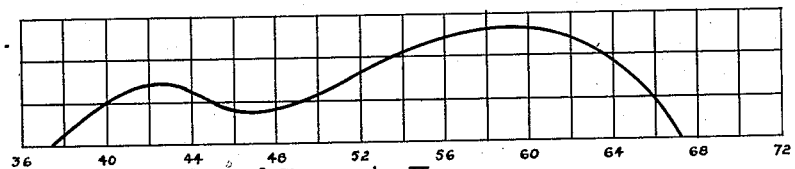
The Second Dye of Example II
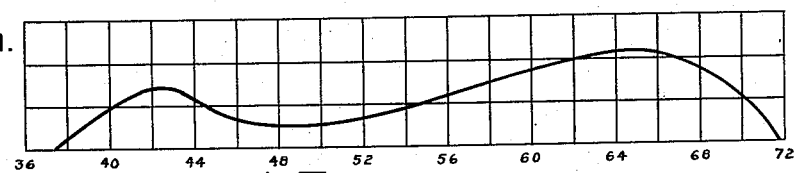
The Dye of Example III
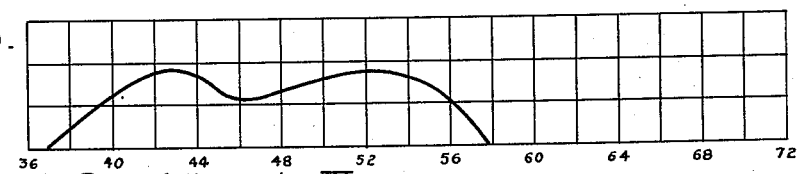
The Dye of Example IV
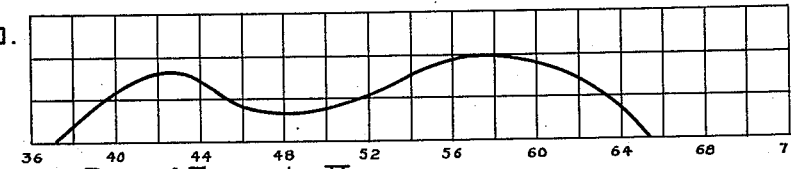
The Dye of Example V
INVENTOR.
Edmund B. Middleton.
BY *Lynn B. Morris*
ATTORNEY Patented Apr. 7, 1942

2,278,461

UNITED STATES PATENT OFFICE 2,278,461

PHOTOGRAPHIC SENSITIZING DYES AND COMPOSITIONS CONTAINING THE SAME

Edmund B. Middleton, Metuchen, N. J., assignor to Du Pont Film Manufacturing Corporation, New York, N. Y., a corporation of Delaware Application January 11, 1939, Serial No. 250,453

8 Claims. (Cl. 95—7)

This invention relates to the preparation of thiazoles which are substituted by heterocyclic sulfur groups. More particularly, it relates to the preparation of 2-methyl-4-thienyl thiazole and its salts. Still more particularly it relates to the preparation of thiocarbocyanine dyes from the aforementioned compounds. The invention also relates to the preparation of photographic emulsions containing such dyes and to photographic processes.

This invention has for an object the preparation of new heterocyclic nitrogen compounds which are useful for preparing dyes having sensitizing properties. A further object is the preparation of cyanine dyes which contain a heterocyclic substituent in a heterocyclic nitrogen nucleus. A still further object is the preparation of such dyes which may be used with photographic silver halide emulsions to extend the spectral sensitivity thereof. Still other objects will appear hereinafter.

The above and other objects are accomplished by the following invention which comprises the preparation of 2-methyl-4-thienyl thiazole and its salts and the preparation of thiocyanine dyes therefrom.

In one embodiment of the invention 2-methyl-4-thienyl thiazole is first reacted with an alkyl salt and then reacted with an orthoester of a carboxylic acid. The two reactions may also be carried out simultaneously.

The ortho esters may be simple or mixed and of aliphatic or aromatic carboxylic acids. The ortho esters of the carboxylic acids result in carbocyanine dyes which comprise two heterocyclic nitrogen nuclei bridged by a trimethenyl radical —CH=CH—CH= or by a substituted trimethenyl radical of the formula $$-CH=C-CH=$$
$$\underset{A}{|}$$

wherein A is a hydrocarbon radical. In the case of the ortho esters of aliphatic carboxylic acids having more than two carbon atoms in the molecule, A is an alkyl radical. When an ortho ester of an aromatic carboxylic acid is used A is an aryl radical.

The invention is not limited, however, to the use of 2-methyl-4-thienyl thiazole as a sole reactive heterocyclic nitrogen compound and to the preparation of the symmetrical cyanine dyes. Other heterocyclic nitrogen compounds having a reactive group in the alpha or gamma position to a heterocyclic nitrogen atom may be used.

Furthermore, cyanine dyes which are bridged by a methenyl radical (—CH=) may be prepared by another embodiment of the invention by reacting 2-methyl-4-thienyl thiazole with a heterocyclic nitrogen compound of the type used in the preparation of cyanine dyes having a reactive thioether or selenoether group in an alpha or gamma position to a heterocyclic nitrogen atom. Such compounds include the quaternary salts of the thioethers and selenoethers of substituted and unsubstituted thiazoles, thiazolines, oxazoles, oxazolines, selenazoles, selenazolines, pyridines, quinolines, indolenines, diazines, e. g. pyrimidines, thiadiazoles, and quinazolines and the corresponding polycyclic compounds, such as benzthiazoles, naphthazole and anthrathiazole.

The invention will be further illustrated but is not intended to be limited by the following examples in which the parts stated are parts by weight.

EXAMPLE I

*Preparation of 2-methyl, 4-thienyl thiazole*

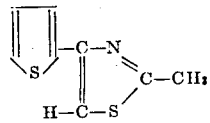

Four and one-half parts of methyl thienyl ketone, prepared according to Organic Synthesis, volume 18, page 1, published by John Wiley & Sons, New York city, in carbon bisulphide were treated with 6 parts of bromine dissolved in a small amount of carbon bisulphide. The bromine solution was added drop by drop while a current of $CO_2$ was passed through the solution. This served to stir the solution and to sweep out the H.Br formed. The carbon bisulphide was then evaporated and 2.6 parts of thioacetamide dissolved in ethyl alcohol were added. After refluxing this mixture three hours, the alcohol was evaporated, and a little water added. Then dilute sodium hydroxide was added until the solution was quite definitely alkaline and an oil separated. This was extracted with ether, the ether solution dried over potassium carbonate, the ether evaporated and the residue subjected to vacuum distillation. The fraction boiling at 140–150° C. at 15 mm. was collected. It melted at 60–61° C. and was identified as 2-methyl-4-thienyl thiazole.

EXAMPLE II

Two parts of 2-methyl-4-thienyl thiazole and one molecular equivalent of ethyl p-toluene sulfonate were heated together in an oil bath at 140° C. for four hours. Dry pyridine was added and a small amount of ethyl orthoformate. On heating to boiling under a reflux condenser, a bluish color developed. After heating for one hour, a solution of potassium iodide was added. The solution was then allowed to stand in a refrigerator. After several hours, bronze crystals formed. These were filtered off and dissolved in hot alcohol which gave a magenta solution. On cooling, crystals were deposited. They were recrystallized once more from fresh alcohol. The dye formed has the following formula:

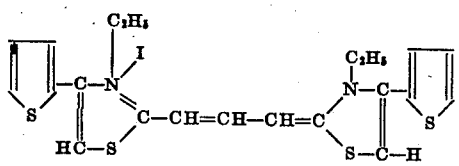

When added to a silver-iodo-bromide emulsion the dye imparts a range of extra sensitivity to 6450 A.° with a maximum at about 6200 A.° When incorporated in a silver chloride emulsion the dye imparts a range of extra sensitivity to 6800 A.° with a maximum of 6100 A.°

The solution from which the bronze crystals were first deposited was further diluted and a small quantity of blue dye separated. This was recrystallized twice. The dye apparently has the formula:

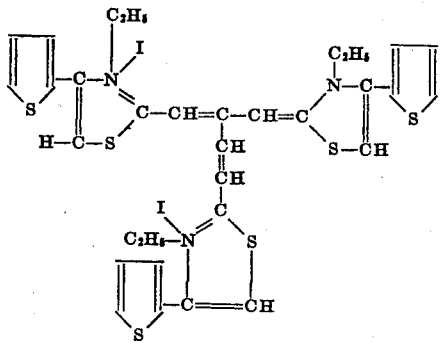

The dye when added to a silver chloride emulsion imparts a range of extra sensitivity to 7200 A.° with a maximum of 6600 A.°

EXAMPLE III

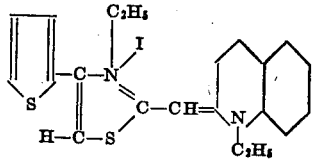

This dye was prepared as follows. Two parts of the ethyl p-toluene sulfonate of 2-methyl-4-thienyl thiazole, prepared as described in Example III, were dissolved in absolute alcohol and then 1.7 parts of 2-methylmercapto quinoline ethiodide were added. After heating to boiling under a reflux condenser, 0.6 part of triethylamine was added. An orange dye formed. It crystallized on cooling and was filtered, washed and recrystallized twice from alcohol. When incorporated in a silver iodo bromide emulsion the dye imparts a range of extra sensitivity to 5700 A.° with a maximum of 5550 A.° When incorporated in a silver chloride emulsion it extended its sensitivity to 5800 A.° with a maximum at 5380 A.°

EXAMPLE IV

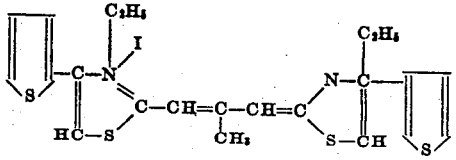

This dye was prepared as follows. One part of 2-methyl-4-thienyl thiazole and 0.8 part of diethyl sulfate were heated for 3 hours at 120–130° C. Then pyridine and .4 part of ethyl orthoacetate were added. On heating to boiling under a reflux condenser, a purplish color formed. After one hour's heating potassium iodide solution was added and the solution allowed to stand in a refrigerator. The precipitate was recrystallized from alcohol, in which it formed a magenta color. When incorporated in a silver chloride emulsion the dye imparts a range of extra sensitivity to 6500 A.° with a maximum of 5820 A.°

EXAMPLE V

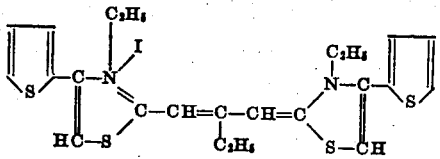

This dye was prepared as follows: One part of 2-methyl, 4-thienyl thiazole and 1 part of freshly redistilled ethyl p-toluene sulfonate were heated for 3 hours at 140° C. Then pyridine and 0.4 part ethyl orthopropionate were added and the solution heated to boiling under a reflux condenser. A purplish color formed. After an hour's heating, potassium iodide solution was added and the solution allowed to cool. The precipitate which formed was recrystallized from alcohol. The alcohol solution was magenta in color. When incorporated in a silver chloride emulsion the dye imparts a range of extra sensitivity to 6400 A.° with a maximum of 3800 A.°

Representative sensitivity curves of the above described emulsions are shown in the accompanying drawing in which Fig. I contains a curve taken from a spectogram of the first dye of Example II in a silver halide emulsion;

Fig. II contains a curve taken from a spectogram of the second dye of Example II in a silver halide emulsion;

Fig. III contains a curve taken from a spectogram of the dye of Example III in a silver halide emulsion;

Fig. IV contains a curve taken from a spectogram of the dye of Example IV in a silver halide emulsion;

Fig. V contains a curve taken from a spectogram of the dye of Example V in a silver halide emulsion.

In place of the specific ortho esters of carboxylic acids may be substituted any ester of this type which is capable of reacting with the heterocyclic nitrogen compounds. Suitable esters include trimethyl ortho-propionate, methyldiethyl n-caproate, methyldiethyl ortho-isocaproate, trimethyl ortho-valerate, trimethyl ortho-formate, trimethyl ortho-benzoate, trimethyl ortho-p-toluate, trimethyl ortho-gamma-phenoxy-butyrate, trimethyl ortho-phenyl-acetate.

In place of the specific salts of 2-methyl-4-thienyl thiazole set forth in the preceding example, any salt may be prepared by reacting an appropriate acid therewith. Thus, the salts of inorganic acids, e. g. hydrochloric, hydrobromic, hydroiodic, sulfuric, phosphoric, etc., and organic acids, e. g. acetic, propionic, maleic, fumeric, phthalic, benzoic, etc. acids may be prepared. For photographic uses, however, the hydrocarbon salts, e. g. the aryl, aralkyl and alkyl salts are preferred and the anions include halide, p-toluenesulfonate, alkylsulfate, nitrate, perchlorate, or, in fact, any salt forming ion that will not render the dye too sparingly soluble or deleteriously affect the photosensitizing properties of the dye.

The condensations are preferably carried out in the presence of an acid binding agent or solvent, e. g. pyridine, piperidine, fused sodium acetate, tri-n-propylamine, and tri-ethanolamine, sodium ethylate, caustic soda, etc. Additional solvents may be used, e. g. acetic anhydride with sodium acetate, alcohol with alkali metal bases, etc.

As stated above, the preparation of unsymmetrical dyes also forms a part of this invention. By adding different heretocyclic nitrogen compounds of the type set forth in the penultimate paragraph preceding the examples or the corresponding alkyl compounds, e. g. having a methyl group instead of a mercapto or selenoether group, to the reaction mixtures a number of cyanine and carbocyanine dyes may be prepared.

In the preparation of emulsions containing my photographic sensitizers, it has been found that the dye may be dissolved in an organic solvent, e. g. methyl alcohol and a volume of solution diluted with water and containing from 5 to 100 milligrams of dye added to 1000 cc. of emulsion, such, for instance, as the usual gelatino-silver-halide emulsion. While it may not be necessary to add some of the sensitizers in a large amount, it may be necessary to add others in amounts larger than those given above; generally about 10 to 20 milligrams is sufficient to obtain the maximum sensitizing effect with a dye having good sensitizing power. The more powerful dyes, however, may require much less. The regulation or adoption of the most economical proportions will be apparent to those skilled in the art upon observing the sensitizing power of the particular dye for the particular emulsion to be formed. The above examples are, therefore, illustrative and not to be understood as limiting the invention in any sense, as it will be apparent that these dyes may be incorporated by other methods in many of the photographic emulsions customarily employed in the art, such for instance as by bathing the plate or film, upon which the emulsion has been coated, in a solution of the dye in an appropriate solvent although this method of incorporating the dye in the emulsion is not preferred over that above described.

Among the advantages of this invention is the fact that the dyes have a higher overall emulsion speed than ordinary cyanine dyes. The dyes sensitize into the deep red and approach the infra red. They are particularly useful in emulsions for the photo-lithographic arts.

As many apparently widely different embodiments of this invention may be made without departing from the spirit and scope thereof, it is to be understood that I do not limit myself to the specific embodiments hereof except as defined by the appended claims.

I claim:

1. A photographic silver halide emulsion containing a dye having a radical of the general formula:

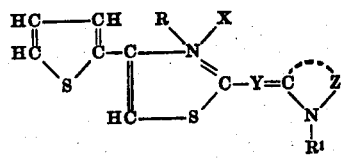

wherein R and R' are hydrocarbon radicals, X is the negative radical of an acid, Y is a trivalent hydrocarbon radical taken from the group consisting of —CH=, —CH=CH—CH=, and

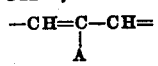

wherein A is a member of the group consisting of hydrogen and hydrocarbon radicals and Z constitutes the atoms necessary to complete a heterocyclic nitrogen nucleus of the type used in the production of cyanine dyes.

2. A photographic element bearing a silver halide emulsion layer containing a dye of the general formula:

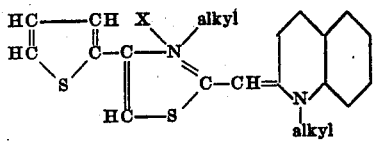

wherein X is the negative radical of an acid.

3. A photographic element bearing a silver halide emulsion layer containing a dye of the general formula:

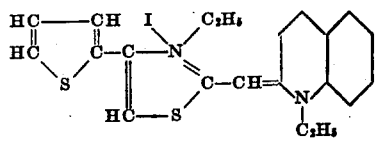

4. A photographic silver halide emulsion containing a dye of the general formula:

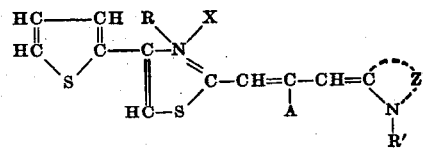

wherein R and R' are hydrocarbon radicals, X is the negative radical of an acid, A is a member of the group consisting of hydrogen and hydrocarbon radicals and Z constitutes the atoms necessary to complete a heterocyclic nitrogen nucleus of the type contained in cyanine dyes.

5. A photographic element bearing a silver halide emulsion layer containing a dye of the general formula:

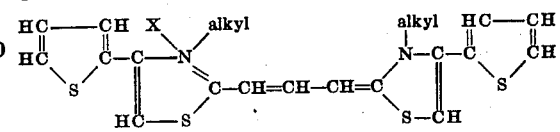

wherein X is the negative radical of a dye.

6. A photographic element bearing a silver halide emulsion layer containing a dye of the general formula:

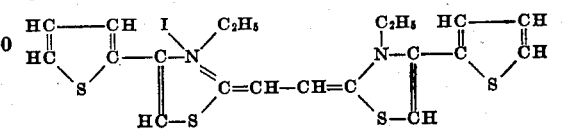

7. A photographic element bearing a silver halide emulsion layer containing a dye of the general formula:
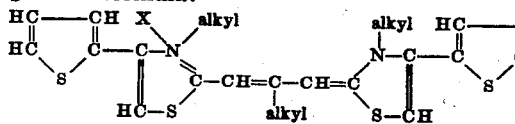
wherein X is the negative radical of an acid.
8. A photographic element bearing a silver halide emulsion layer containing a dye of the general formula:
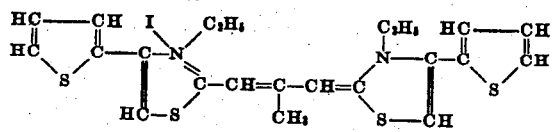
EDMUND B. MIDDLETON.